United States Patent Office 3,312,644
Patented Apr. 4, 1967

3,312,644
METHOD FOR PREPARING A POLYESTER RESIN COMPOSITION
Makio Miyairi, Ibaragi-ken, Japan, assignor to Kabushiki Kaisha Hitachi Seisakusho, Chiyoda-ku, Tokyo-to, Japan, a joint-stock company of Japan
No Drawing. Filed Nov. 26, 1962, Ser. No. 240,127
Claims priority, application Japan, Nov. 30, 1961, 36/42,609
1 Claim. (Cl. 260—22)

This invention relates to insulated electrical coils, and more particularly it relates to coils insulated with a polyester resin varnish having highly desirable physical and electrical characteristics.

An unsaturated polyester resin is obtained by reacting a polyhydric alcohol and an acid selected from among saturated polybasic acids such as $\alpha.\beta$ unsaturated polybasic acids, and saturated acids such as phthalic acid and adipic acid, which are copolymerized with a vinyl monomer in the copresence of a catalyst and an accelerator.

However, since this crosslinking reaction is a radical polymerization reaction, the polymerization reaction has the disadvantage of being impeded by the oxygen in the air, whereby surfaces of the materials contacting air do not lose their adhesiveness or tackiness for a long time. This disadvantageous tendency is especially pronounced in the cases wherein the resin is applied as a thin film by flow-coating or by brush painting.

Accordingly, when such a resin is to be used as a varnish, it is necessary to remove the above-described disadvantage.

Heretofore, a number of methods for eliminating this disadvantage have been proposed. One of these methods comprises elevating the softening point of an unsaturated alkyd resin or blending in a substance of high softening point, and when this is to be actually used, dissipating the unbridged monomer so as to produce an apparently dry film.

Another of the methods proposed hitherto comprises adding to an alkyd resin a small quantity of waxes which do not react with the said resin, whereby when this mixture is applied on an article and baked, the setting of the resin causes gelation to progress, and the abovesaid waxes are forced to move to the surface to form an extremely thin film, thereby automatically shielding off the surface of the polyester resin film from direct contact with the oxygen in the air.

In the former of the above-mentioned two methods, since the surface of the film is merely a physically dry condition, the said surface is deficient in such physical properties as water resistance and surface hardness, and moreover, the softening point of the alkyd resin film is not very high. Accordingly, when the temperature of the coated article is raised, such undesirable conditions as softening of the surface or development of tackiness result. For the above reasons, the varnish obtained by this former method is not suitable as a varnish for coils of electrical equipment which operate under the condition of rise in conductor temperature.

In the case of the latter of the above-described methods, the adhesion between the conductor for coils (for example, so-called magnet wire) and the alkyd resin with waxes added thereto is poor. Moreover, since a wax film is formed on the surface it has not been possible to deposit thereon an additional coating of varnish. Hitherto, in this case, varnish had been applied after the wax film has been completely removed by means of a solvent. However, complete dissolving and removal of the wax film by the use of a solvent is difficult and requires a considerable amount of solvent.

Furthermore, since the polyester resin varnishes used at present have high cohesiveness, they are subject to such defects as so-called "climbing" and "crawling," and it has been difficult to obtain a uniform and smooth film.

These defects especially increase in severity with decreasing film thickness of the coating and are particularly pronounced in the case of coating an inclined surface. In this respect, in the case of a varnish to which waxes have been added, the polarity of coupling of the alkyd resin is reduced somewhat, and the intermolecular strength is consequently weakened slightly, wherefore the abovesaid defects are relatively less apparent. However, in this case, the afore-described disadvantages still remain.

The problem of the various disadvantages described above can be solved, according to the present invention, by treating coils with the use of a polyester resin varnish produced by ester interchange of a vegetable oil such as a drying oil or semi-drying oil with a polyhydric alcohol, adding thereto a polyhydric alcohol and such a polybasic acid as an $\alpha.\beta$ unsaturated polybasic acid or a saturated polybasic acid, causing polycondensation and synthesis of an unsaturated alkyd, adding thereto dicyclopentadiene at any stage in the said synthesis to produce an unsaturated cyclopentadiene alkyd resin, dissolving thereinto a compound having a vinyl radical and a small quantity of silicone resin, and further adding, as necessary, an accelerator and a catalyst.

Examples of drying oils which can be used for the present invention are safflower oil, soybean oil, tung oil, perilla oil, and linseed oil. Examples of semi-drying oils are sesame oil, cottonseed oil, and rapeseed oil. The use of a drying oil is especially advantageous because of the good drying characteristic of the varnish film obtained thereby. However, even with the use of a semi-drying oil, for example, cottonseed oil, a quick-drying varnish can be obtained, and such an oil is a valuable raw-material because of its low price.

It will be obvious that the above-listed oils can be used as mixtures depending on the purpose. In each case, there is an optimum quantity of oil to be used. If the quantity of oil with respect to the quantity of the polyester resin containing this oil is excessive, the polyester resin characteristics will be lost, and the drying characteristic will become poor. Moreover, the resulting film will become excessively soft and will be unsuitable especially as a varnish for coils of electrical rotary machines.

Furthermore, in the case of a polyester resin, which can contain a large quantity of an $\alpha.\beta$ unsaturated dibasic acid, if the drying oil quantity is large, gelation will occur in the esterification stage of the process, and the production of an unsaturated alkyd will become difficult. Hence, a suitable oil content of the polyester resin normally is up to 25 percent by weight.

Examples of compounds which can be used as the aforementioned compound having a vinyl radical are styrene, vinyl toluene, divinylbenzene, and methyl methacrylate.

As accelerators, for example, cobalt naphthenate, manganese naphthenate, iron naphthenate, and lead naphthenate, which are ordinarily used for polyester resin varnishes, can be used. Similarly, as catalyst, a substance which has been heretofore used for polyester resin varnishes, for example, benzoyl peroxide, lauroyl peroxide, methyl ethyl ketone peroxide, and cumene hydroperoxide, can be used.

The liquid resin thus obtained, that is, the polyester resin varnish according to the present invention, not only eliminates the deficiencies accompanying conventional polyester resin varnishes, but is of lower price than any of the conventional materials. Moreover, the varnish of this invention dries more rapidly than the conventional varnish for electrical coils.

Accordingly, an insulated coil treated with such a varnish of the solventless type has excellent heat stability and, moreover, has many more highly desirable features as described below.

In the first place, it is possible to provide an insulated coil through the use of a quick-drying varnish. It is also possible to reduce substantially the time necessary for heating and drying, wherefore such a treatment is most suitable for quantity production of coils. Furthermore, in the case wherein an insulating varnish is to be applied on an article having a surface which is not smooth, such as a coil for ordinary electrical equipment, it is possible to provide a film having good adherence. Still furthermore, it is possible to provide a film in which the occurrence of such defects as "climbing" and "crawling" due to the high cohesiveness of polyester resin is effectively prevented.

In order to indicate still more fully the nature of the present invention, the following examples of typical procedure are set forth, it being understood that these examples are presented as illustrative only, and that they are not intended to limit the scope of the invention.

EXAMPLE 1

254 grams of safflower oil, 26 grams of glycerine, and 0.08 gram of calcium acetate were mixed and heated at 240 degrees C. for 30 minutes to effect ester interchange.

Next, the resulting material was cooled to a temperature below 100 degrees C., and 408 grams of maleic anhydride, 221 grams of phthalic anhydride, 356 grams of ethylene glycol, 228 grams of dicyclopentadiene, and hydroquinone were further added. Then the mixture was agitated in a two-liter, 4-necked flask while carbon dioxide gas was passed therethrough and caused to react for one hour at 160 degrees C., after which the mixture was further caused to react for three hours at 180 degrees C.; then the temperature was raised to 200 degrees C., and the reaction caused to continue. During the progress of this reaction, the reactant was sampled a little at a time. 60 parts of each sample were dissolved in 40 parts of xylene, and the viscosity was measured by means of a Gardner-Holt bubble viscosimeter. The point at which the viscosity so measured was G–H was considered as the reaction end point.

After this resin liquid was cooled, 60 parts thereof were sampled and dissolved in styrene containing 40 p.p.m. of paratertiary-butyl catechol to obtain a varnish. To this varnish, cobalt naphthenate (containing 6 percent cobalt) was added as an accelerator, and "Permer N" (dimethylphthalate solution of methyl ethyl ketone peroxide) was added as a catalyst, and the varnish with these additives was applied onto a steel sheet. When dried, the film of this varnish exhibited a bright luster. Furthermore, it was found that even when this varnish was applied onto a steel sheet suspended vertically, defects such as "climbing" did not develop, and the varnish was strong and durable. Moreover, specimens exhibited excellent flexural and adhesive properties which passed the requirements of a flexure test on a mandrel of 3 mm. diameter.

However since a cyclopentadiene oil-modified solventless varnish produced in the above-described manner has an intrinsic air-drying property, there is a tendency in the case when a large quantity of accelerator, such as cobalt naphthenate, is used for the surface to dry rapidly and the hardening of the interior to be retarded; and an extremely slight wrinkling is observed.

It has been found that this problem can be solved by adding to the varnish a minute quantity of methylphenylsiloxane silicone resin, e.g., SR–82 or an equivalent thereof, and moreover, the water resistance of the varnish is increased at the same time.

It also has been found that it suffices to add 0.1 part of silicone resin SR–82 to 100 parts of the polyester resin varnish produced in the aforedescribed manner. The electrical properties of the film obtained in this case are indicated by a dielectric loss tangent or dielectric dissipation factor of 0.01 and a volume resistivity of $10^{14}$ ohm cm. When used as a coil varnish, this varnish had extremely good adherence to the conductor. Moreover, since voids and solvent do not remain in the interior of the film, it is possible to obtain insulated coils exhibiting life test results which are several times those of conventional coil varnishes.

EXAMPLE 2

265 grams of soybean oil, 48 grams of glycerol, and 0.08 gram of calcium acetate were mixed and refluxed for one hour at 240 degrees C., while carbon dioxide gas was passed therethrough, to cause ester interchange.

Next, the reactant was cooled to a temperature below 100 degrees C., and 400 grams of maleic anhydride, 200 grams of phthalic anhydride, and 0.5 gram of hydroquinone were added thereto. Then this mixture was placed in a two-liter, 4-necked flask and caused to react for one hour at 160 degrees C. while carbon dioxide gas was passed therethrough; then, after the reaction had been carried out for a further three hours at 180 degrees C., the temperature was raised 200 degrees C., and the reaction was permitted to continue until the viscosity became equal to that described as the end point in Example 1. After the viscous, thick resin thus obtained was cooled, 60 parts thereof were dissolved in a mixture of 39 parts of vinyl toluene containing 40 p.p.m. of para-tertiarybutyl catechol and 1 part of divinylbenzene to obtain a varnish.

To 100 parts of the varnish thus produced, 0.15 part of silicone varnish KR–280 further were added, and the mixture was mixed uniformly.

When this varnish was used, lead naphthenate and benzoyl peroxide were added, and the resulting varnish was applied onto a steel sheet and baked at 110 degrees C., whereupon the varnish exhibited a remarkable quick-drying property which could not be attained by conventional insulating varnishes. It hardened and dried within approximately 10 minutes to form a tough film.

The film formed by this varnish was found to have electrical properties equivalent to those mentioned in Example 1, good water resistance, and excellent adhesion to conductors for coils.

EXAMPLE 3

245 grams of safflower oil, 26 grams of glycerol, and 0.08 gram of calcium acetate were mixed and caused to react in the same manner as in Example 2 to accomplish ester interchange.

After the resulting batch was cooled to 100° C., 383 grams of maleic anhydride, 277 grams of isophthalic acid, 346 grams of ethylene glycol, 222 grams of dicyclopentadiene, 0.5 gram of hydroquinone, and 80 grams of xylene were added, and this mixture was placed in a two-liter, 4-necked flask, with a dienestarch trap, containing xylene up to the circulation level. Then the mixture was caused to react, as carbon dioxide gas was passed therethrough, for three hours at 180~200 degrees C. The temperature of the mixture was then raised to 225° C., and, similarly as in the case of Example 2, the reaction was continued until the viscosity reached G-H.

Next, the circulation of the xylene was stopped and the reaction temperature was lowered to 180 degrees C. At this temperature, the pressure was reduced, and the xylene was recovered until practically no further xylene, the circulation solvent, distilled.

Upon completion of the recovery of xylene, the remaining product was cooled, and 60 parts of the resin component formed, that is, a cyclopentadiene unsaturated oil modified alkyd resin was dissolved in a styrene solution containing 40 p.p.m. of para-tertiary-butyl catechol, and a varnish was obtained.

Next, 0.15 part of silicon varnish KR–280 were added to the varnish obtained in the above-described manner, and the mixture was mixed uniformly, whereupon a quick-drying varnish was obtained.

To this varnish, lead naphthenate and benzoyl peroxide were further added. When this varnish was then applied onto a steel sheet and baked at 110 degrees C., it hardened and dried in a short time to produce a tough film with high adhesive strength. When this varnish was caused to flow between glass plates with spacers of 2 mm. thickness interposed therebetween and to harden, a resin plate was obtained. Measurements of the electrical properties of this resin plate indicated a dielectric loss tangent of 0.010 at 25 degrees C. and a volume resistivity of $10^{15}$ ohm cm. at 70 degrees C.

EXAMPLE 4

100 grams of soybean oil, 30 grams of linseed oil, 27 grams of glycerol, and 0.06 gram of calcium acetate were mixed, placed in a two-liter, 4-necked flask provided with a reflux condenser, and heated to 230 degrees C. While this mixture was maintained at this temperature, 45 grams of dicyclopentadiene were added thereto dropwise from a separating funnel over a period of approximately 1.5 hours, after which, heating was continued for a further 30 minutes.

Next, the mixture was cooled to a temperature below 100 degrees C., and 345 grams of maleic anhydride, 423 grams of phthalic anhydride, 200 grams of dicyclopentadiene, 0.5 gram of hydroquinone, and 80 grams of xylene were added thereto.

The above mixture was placed in a three-liter, 4-necked flask containing xylene up to the circulation level, and, similarly as in the case of Example 2, an azeotropic system was caused to be formed as carbon dioxide gas was blown into the mixture, which was thus caused to condense as condensation water was removed.

During this condensation process step, resin samples were taken, and the viscosity of a varnish obtained by dissolving 60 parts of each sample in 40 parts of xylene was measured, by means of a Gardner bubble viscosimeter. When the viscosity reached R-S, the xylene circulation was stopped and the reactant temperature was lowered to 180 degrees C. Next, an evacuating apparatus was connected to the vessel for this reaction, and xylene, used as the azeotropic solvent, was distilled under reduced pressure.

When the viscosity of this varnish was W-X, the reaction was completed.

60 parts of the resin varnish formed in the above-described manner, that is, a cyclopentadiene unsaturated modified alkyd resin, were dissolved in styrene containing 40 p.p.m. of para-tertiary-butyl catechol, and 0.15 part of silicone varnish SR-82 were added to the solution, which was then thoroughly agitated.

To the varnish thus obtained, cobalt naphthenate and cyclohexanone peroxide were added, and the resulting varnish was applied onto pieces of steel sheet and left at room temperature, whereupon it hardened and dried in 3 to 6 hours to form a tough film with smooth surface and bright luster.

EXAMPLE 5

110 grams of cottonseed oil, 110 grams of soybean oil, 37 grams of trimethylolpropane, and 0.08 gram of calcium acetate were mixed and heated for two hours at 230 degrees C., as carbon dioxide gas was passed therethrough, in a 4-necked flask provided with a reflux condenser to cause ester interchange. The mixture was then cooled to a temperature below 100 degrees C., and 397 grams of propylene glycol, 430 grams of maleic anhydride, 163 grams of phthalic anhydride, 254 grams of dicyclopentadiene, 0.35 gram of hydroquinone, and 70 grams of xylene for circulation were added thereto.

Next, carbon dioxide gas was passed through this mixture to form an azeotropic system, and reaction was caused to proceed for one hour at 160 degrees C. while reaction water was removed. This step was followed by a further three hours of reaction at 180 degrees C., then an additional reaction at 200 degrees C. During this last reaction, samples of the reactant were taken, and when the Gardner viscosity of 60 parts of a sample dissolved in 40 parts of xylene became R, the temperature of the reactant was lowered to 180 degrees C., the xylene circulation was stopped, and the xylene was distilled under reduced pressure.

When the viscosity measured by the above indicated method reached W-X, the reaction was stopped, and the product was cooled as carbon dioxide gas was passed therethrough. At a temperature of 140 degrees C., 0.35 gram of hydroquinone were added and dissolved. 60 parts of the resulting cyclopentadiene unsaturated oil modified alkyd was dissolved in vinyl toluene containing 40 p.p.m. of para-tertiary-butyl catechol, and 0.15 part of silicone varnish KR-280 were further added to the solution, which was then thoroughly agitated.

To the varnish thus obtained, lead naphthenate and benzoyl peroxide were added, and the resulting varnish was applied onto a steel sheet and heated for one hour at 105 degrees C., whereupon a smooth film with bright luster was obtained. Moreover, this film withstood flexural tests on a 3 mm. diameter mandrel.

Furthermore, cobalt naphthenate and a catalyst of the methyl ethyl ketone group were used respectively as an accelerator and as a catalyst, and the varnish was molded in a mold of 2 mm. thickness and hardened at room temperature. The electrical properties of the molded plate thus formed were as follows: tan $\delta = 0.02$, $\epsilon = 4$, and volume resistivity = over $10^{14}$ ohm cm.

EXAMPLE 6

231 grams of cottonseed oil, 36 grams of pentaerythritol, and 0.08 gram of calcium acetate were mixed and heated for two hours at 245 degrees C. to effect ester interchange. The batch was then cooled to a temperature below 100 degrees C., and 332 grams of ethylene glycol, 496 grams of fumaric acid, 158 grams of phthalic anhydride, 247 grams of dicyclopentadiene, and 0.35 gram of hydroquinone were added thereto. This mixture was agitated as carbon dioxide gas was passed therethrough in a two-liter, 4-necked flask and caused to react similarly as described in Example 1. During this process, samples were taken, and the instant at which a sample indicated a Gardner viscosity between N and P was taken as the end point of the reaction. At an intermediate point in the cooling process, at 170 degrees C., 0.35 gram of hydroquinone were added to the batch and dissolved. After cooling, 60 parts of the resulting resin were dissolved in styrene containing 40 p.p.m. of para-tertiary-butyl catechol. Then 0.15 part of silicone varnish KR-280 were further added to the resulting varnish, which was then thoroughly agitated.

Cobalt naphthenate and lead naphthenate as accelerators and benzoyl peroxide as a catalyst were added to the varnish and dissolved thoroughly. Then the varnish was applied onto a steel sheet and dried for two hours at 105 degrees C., whereupon a smooth film with bright luster was obtained.

While, in the foregoing examples, in order to indicate the properties of the insulating varnish to be used in the present invention, only the properties of this varnish as a film applied on a steel sheet and as a resin plate have been described, it has been found that this varnish exhibits excellent performance when it is used as an insulating varnish for conductors of coils in electrical rotating machines.

For example, two groups of electric motors were provided with kraft paper as slot insulating material, and polyester wire was used as the conductor for the coils. In one group of motors, a conventional, thermosetting varnish of relatively high heat resistance was used as the impregnating varnish, while in the other group, the varnish according to this invention was used for the same purpose. Comparative measurements were made by the so-called motoret test method according to the A.I.E.E. on both groups of motors, and the result in each case was converted into life of the motor at 140 degrees C. It was found that, while the mean life in the case of the conventional, thermosetting varnish was 7,000 hours, that in the case of the insulated coil according to this invention was 20,000 hours, and the conspicuously excellent characteristics of the varnish of this invention were reconfirmed. The reason for these excellent characteristics lies in the high adhesiveness and high flexibility of this solventless varnish. It has also been found that the treatment with this polyester resin varnish requires a heating-drying time which is one-fourth to one-half of that required by ordinary thermosetting varnishes.

Since it is obvious that many changes and modifications can be made in the above described details without departing from the nature and spirit of the invention, it is to be understood that the invention is not to be limited to the details described herein except as set forth in the appended claim.

What is claimed is:

A process for the production of a polyester resin composition for use as an insulating varnish for electrical conductors, which comprises reacting an oil selected from the group consisting of drying and semidrying oils and mixtures thereof with a polyhydric alcohol to undergo ester interchange; adding thereto a polyhydric alcohol in an amount of substantially 13–16 weight percent, calculated on the ester formed, and up to 25 weight percent of at least one acid selected from the group consisting of saturated and unsaturated polybasic acids; subjecting the resulting mixture to polycondensation to synthesize an unsaturated alkyd; adding substantially 70–170 weight percent of dicyclopentadiene and heating the mixture to produce a cyclopentadiene unsaturated alkyd resin; dissolving therein approximately 40 p.p.m. of a compound having a vinyl radical and substantially 0.1–0.15 weight percent of a silicone resin; and incorporating therein an accelerator and a catalyst to complete the varnish.

UNITED STATES PATENTS

References Cited by the Examiner

| | | | |
|---|---|---|---|
| 2,392,732 | 1/1946 | Gerhart | 260—23.7 X |
| 2,551,387 | 5/1951 | Moffett et al. | 260—23.7 |
| 2,677,671 | 5/1954 | Yuska et al. | 260—23.7 X |

ALFRED L. LEAVITT, *Primary Examiner.*

WILLIAM L. JARVIS, *Examiner.*